US012427463B2

United States Patent
Subedi et al.

(10) Patent No.: US 12,427,463 B2
(45) Date of Patent: Sep. 30, 2025

(54) INTEGRATED ABRASION RESISTANT BARRIER FOR FILTER MEDIA

(71) Applicant: Cummins Filtration Inc., Nashville, TN (US)

(72) Inventors: Yashpal Subedi, Madison, WI (US); Alexis Orea Amador, Middleton, WI (US); Steve Mitchell Hiles, Gallatin, TN (US); Steve Anderson, Eau Claire, WI (US); Mark P. Adams, Madison, WI (US); Jeremiah Cupery, Madison, WI (US); Jason A. Scherck, Madison, WI (US)

(73) Assignee: Cummins Filtration Inc., Nashville, TN (US)

( * ) Notice: Subject to any disclaimer, the term of this patent is extended or adjusted under 35 U.S.C. 154(b) by 491 days.

(21) Appl. No.: 17/865,177

(22) Filed: Jul. 14, 2022

(65) Prior Publication Data

US 2024/0017196 A1    Jan. 18, 2024

(51) Int. Cl.
*B01D 46/00* (2022.01)
*B01D 46/52* (2006.01)

(52) U.S. Cl.
CPC ..... *B01D 46/0005* (2013.01); *B01D 46/0001* (2013.01); *B01D 46/521* (2013.01); *B01D 2265/04* (2013.01); *B01D 2279/60* (2013.01)

(58) Field of Classification Search
CPC ............ B01D 46/0005; B01D 46/0001; B01D 46/521; B01D 2279/60; B01D 2265/028; B01D 2313/2031; B01D 29/13

USPC .......................................................... 55/497
See application file for complete search history.

(56) References Cited

U.S. PATENT DOCUMENTS

| 4,861,353 A * | 8/1989 | Wyss ..................... B01D 46/06 55/528 |
| 2007/0102101 A1* | 5/2007 | Spearin ................ B01D 29/902 156/204 |
| 2010/0307659 A1* | 12/2010 | Tate ..................... B01D 29/012 210/232 |
| 2012/0279185 A1* | 11/2012 | Appelo .................. B01D 29/15 414/800 |
| 2015/0113929 A1* | 4/2015 | Jackson ............. B01D 46/2411 55/482 |
| 2021/0268421 A1* | 9/2021 | Currell ................... B01D 46/08 |

FOREIGN PATENT DOCUMENTS

CN             110280076 A   *   9/2019

* cited by examiner

*Primary Examiner* — Qianping He
(74) *Attorney, Agent, or Firm* — Foley & Lardner LLP

(57) ABSTRACT

A filter element includes a media pack and a support body. The media pack may be arranged in an enclosed shape defining a central cavity. The media pack includes a formed filter media and an abrasion resistant barrier coupled to the formed filter media. The support body is disposed within the central cavity. The abrasion resistant barrier separates the media pack from the support body. In some instances, the media pack also includes a plurality of adhesive beads disposed between the abrasion resistant barrier and the formed filter media and coupling the abrasion resistant barrier to the formed filter media.

18 Claims, 7 Drawing Sheets

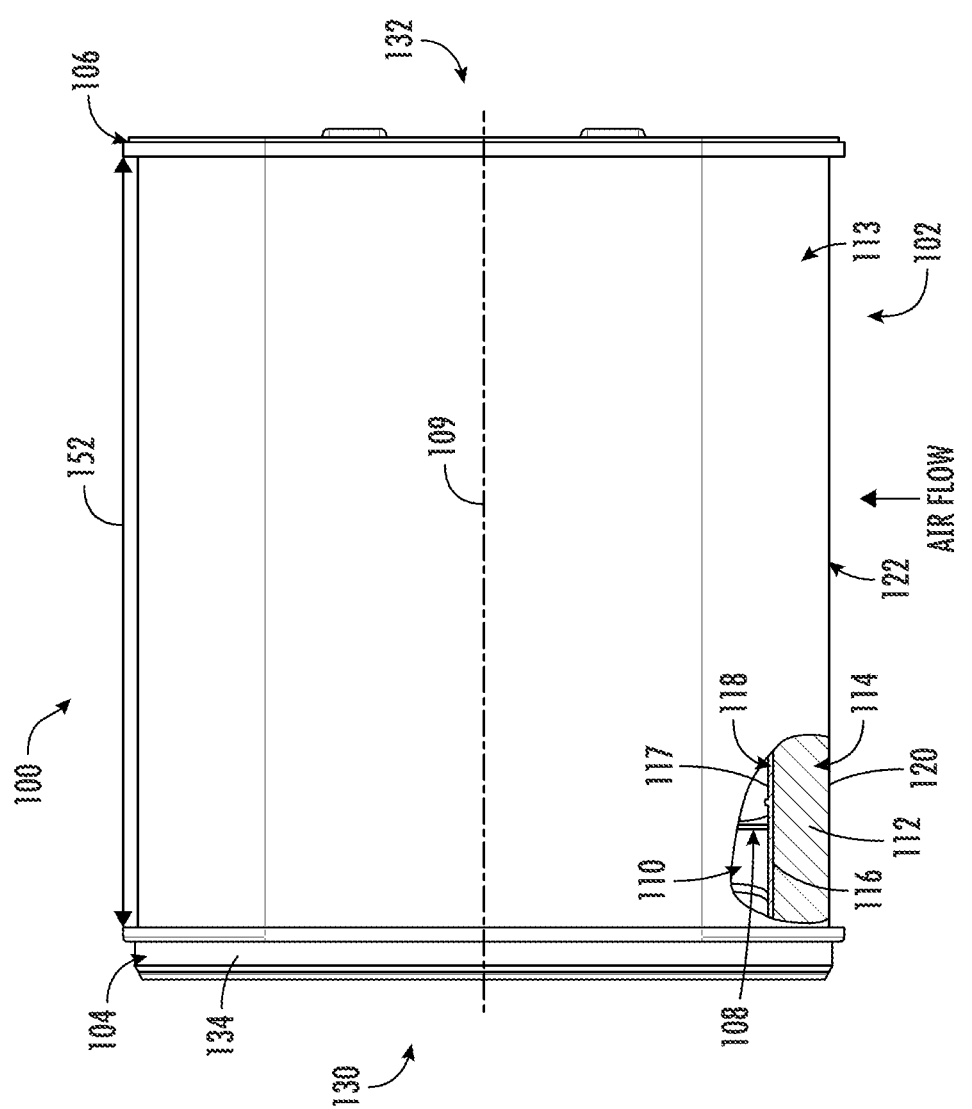
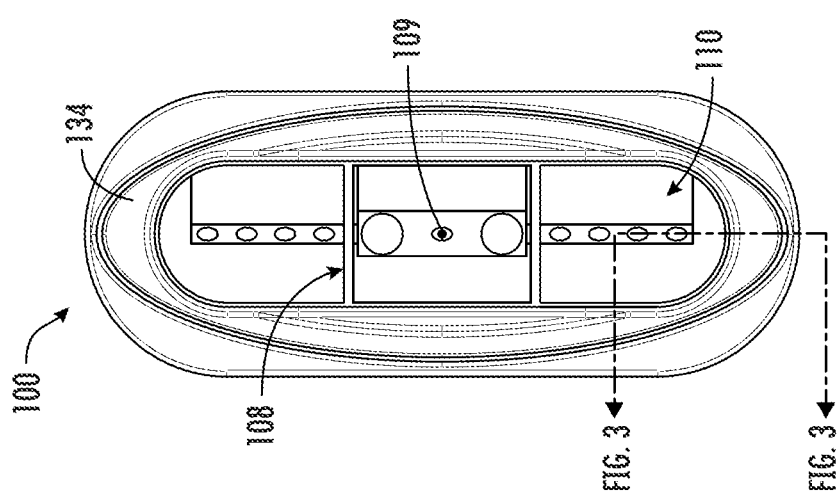

INTEGRATED ABRASION RESISTANT BARRIER FOR FILTER MEDIA

TECHNICAL FIELD

The present disclosure relates generally to filters for use with internal combustion engine systems.

BACKGROUND

Internal combustion engine systems require air and fuel to operate. The air may be contaminated with particulate matter (e.g., dirt, oil, etc.), which may damage the engine system if not removed from the air. To remove the particulate matter, the air is generally passed through a filter assembly, which may include a filter element, to capture solid particles entrained within the air.

SUMMARY

One embodiment of the present disclosure relates to a filter element including a media pack and a support body. The media pack may be arranged in an enclosed shape defining a central cavity. The media pack includes a formed filter media and an abrasion resistant barrier coupled to the formed filter media. The support body is disposed within the central cavity. The abrasion resistant barrier separates the media pack from the support body. In some instances, the media pack also includes a plurality of adhesive beads disposed between the abrasion resistant barrier and the formed filter media and coupling the abrasion resistant barrier to the formed filter media.

Another embodiment of the present disclosure relates to a media pack including a formed filter media and an abrasion resistant barrier coupled to the formed filter media. The formed filter media includes a first plurality of pleat tips defining a first face, and a second plurality of pleat tips defining a second face spaced apart from the first face. The abrasion resistant barrier extends across the first plurality of pleat tips and substantially covers the first face.

Yet another embodiment of the present disclosure relates to a method of manufacturing a media form or media pack. The method includes providing a formed filter media having a first plurality of pleat tips defining a first face and a second plurality of pleat tips defining a second face that is spaced apart from the first face. The method further includes joining an abrasion resistant barrier to the formed filter media so that the abrasion resistant barrier extends across the first plurality of pleat tips and substantially covers the first face.

It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing at the end of this disclosure are contemplated as being part of the subject matter disclosed herein.

BRIEF DESCRIPTION OF THE FIGURES

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

FIG. 2 is a top view of a filter element, according to an embodiment.

FIG. 3 is a partial side view of the filter element of FIG. 2.

Figure 1:
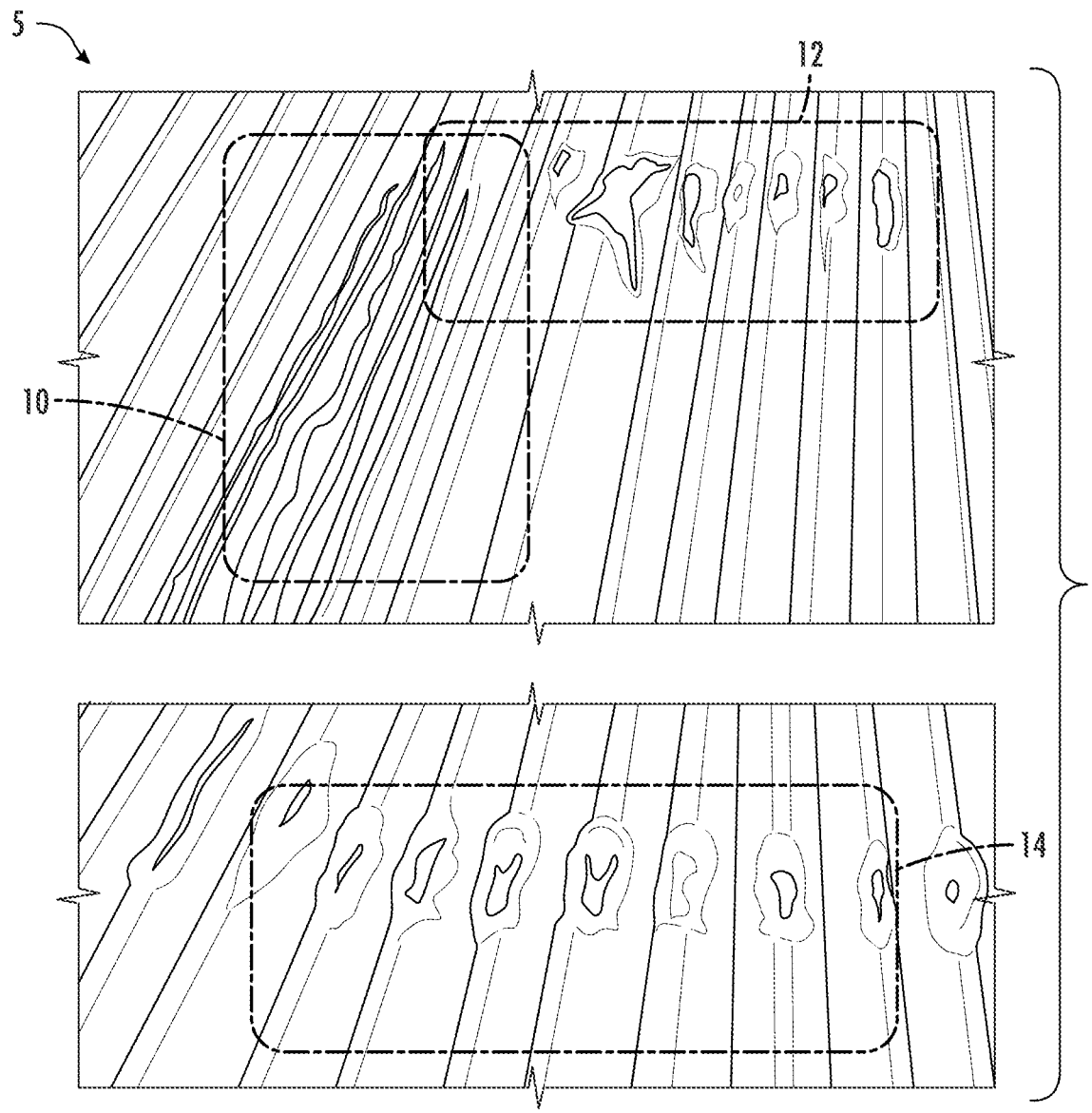
FIG. 1 is a perspective view of a worn filter media pack of a filter element, according to an embodiment.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION

Embodiments described herein relate generally to filter element designs for engine-mounted air cleaner assemblies. The various concepts introduced above and discussed in greater detail below may be implemented in any of numerous ways, as the described concepts are not limited to any particular manner of implementation. Examples of specific implementations and applications are provided primarily for illustrative purposes.

I. Overview

In various applications, an air cleaner assembly may be positioned in a high vibration area of an internal combustion engine system. For example, in a vehicle application, the air cleaner assembly may be mounted directly to the engine instead of in areas of the chassis that are remote from the engine and isolated from engine vibrations. In these instances, the air cleaner housing (e.g., filter housing, shell housing, etc.) may transmit high, cyclical and/or random vibrations from the engine to the filter element and any other components within the air cleaner housing. Exposure to engine vibrations can cause the filter media of the filter element to vibrate and rub against the support structure of the filter element including the center tube of the filter element, which may be used to support the filter media against radial loading due to the change in pressure across the filter element. Over time, exposure to engine vibrations can cause premature wear in the filter media. Excessive media wear may ultimately result in tearing of the filter media and allow dirty air to bypass the filter element and enter the engine.

FIG. 1 shows a perspective view of an example filter media pack 5 of a filter element after prolonged exposure to a high vibration environment. During operation, the folded tips of the filter media pack may vibrate within the open spaces between adjacent tips, which may cause collapse of corrugations in the formed filter media as shown in a first region 10 of the filter media pack. Additionally, the filter media pack may rub against a support body which, over time, can wear away filter media material and/or cause tearing along the tips of the filter media pack as shown in second region 12 and third region 14.

At least one implementation described herein relates to a filter element that includes a media pack having an integrated abrasion resistant barrier (e.g., wear barrier, etc.) that stiffens the media pack and at least partially isolates the media from the support structure of the filter element. The filter element may include a media pack including a formed filter media that is arranged into an enclosed shape (e.g., a circular shape, an oval shape, a racetrack shape, etc.) defining a central cavity. As used herein, "formed filter media" refers to a filter media layer and/or sheet that is bent, embossed, or otherwise formed into a desired (e.g., non-flat) structure. The formed filter media may be a pleated media that is bent or folded back onto itself in a repeating manner (e.g., in an accordion shape, etc.) to increase a surface area and dust holding capacity of the media. The formed filter media may additionally or alternatively be corrugated or embossed with a desired shape or pattern to increase the structural strength of the filter media.

The filter element may also include a support body (e.g., a support structure, an inner body, a center tube, a frame, etc.) disposed within the central cavity and/or other areas of the filter element that supports the media pack against the pressure drop across the media pack. The abrasion resistant barrier may be coupled to the formed filter media between the formed filter media and the support body so as to prevent the formed filter media from rubbing against the support body.

In some embodiments, the media pack further includes multiple bands of adhesive that bond the abrasion resistant barrier to the formed filter media. The adhesive bands may also stiffen the media pack by coupling adjacent pleats of the formed filter media together, reducing the free, unsupported length of the pleats, which can reduce the amplitude of media motion in response to engine vibration. The adhesive and abrasion resistant barrier together may form a harder surface than the material of the support body. The reduction or elimination of media motion, in combination with the intervening material between the formed filter media and the support body, may reduce wear and increase the overall service life of the filter element across multiple applications.

Although the foregoing description is made with reference to engine-mounted air cleaner assembly designs, it should be appreciated that a similar filter element structure may be used in a variety of other applications and mounting configurations, including chassis-mounted air cleaner assembly designs and/or any other mounting arrangement in which the filter element is exposed to vibrations.

As described above, the filter element may include a media pack and supporting components (e.g., center tube, frame, endcaps, seals, etc.) that physically connect the media pack to the air cleaner housing. As used herein, "media pack" refers to a portion of the filter element that removes particulate contaminants from a fluid passing through the filter element. "Media form" refers to a joined layering of materials (e.g., sheets of media or structural materials) that may be folded, stacked, or otherwise altered into a desired shape to form the media pack. Finally, "filter media" may be used to describe, generally, one or more of the media pack, media form, and/or a filter material that is used to form the media form and media pack throughout the description.

I. Example Filter Elements

FIG. 2 and FIG. 3 show a top and a side view, respectively, of a filter element 100, according to an example embodiment. The filter element 100 may be a replaceable air filter element that is configured to filter air for an internal combustion engine system. The filter element 100 includes a media pack 102, a first endcap 104, a second endcap 106, and a support body 108. In other embodiments, the filter element may include additional, fewer, and/or different components.

The filter element 100 may be arranged as an outside-in flow filter element having an outer dirty side and an inner clean side. In an alternative arrangement, the filter element 100 may be an inside-out filter element having an inner dirty side and an outer clean side. Fluid to be filtered passes from the dirty side of the filter element 100 to the clean side of the filter element 100. In the embodiment of FIGS. 2-3, the filter element 100 is a radial flow filter element in which flow passes in a substantially radial direction relative to a central axis 109 of the filter element 100.

In some embodiments, the filter element 100 may form part of an air cleaner assembly (e.g., a filter assembly, etc.) that includes an air cleaner housing (not shown) and/or other components to engage the filter element 100, secure the filter element 100 in position, and prevent leakage from the air cleaner assembly. The filter element 100 may be configured for use in an air cleaner housing that is mounted directly to an engine and that is exposed to vibrations from the engine. In other embodiments, the filter element 100 may be at least partially isolated from engine vibrations by a support structure (e.g., base, mount, etc.) that separates the air cleaner assembly from the engine. In yet other embodiments, the filter element 100 is disposed remote from the engine (e.g., the filter element 100 may be coupled to a chassis of a vehicle or in another suitable location).

The media pack 102 is configured to filter fluid passing therethrough. As shown in FIG. 2, the media pack 102 may be arranged in an enclosed shape defining a central cavity 110. The enclosed shape may be a racetrack shape having straight sides connected by curved portions of the media pack 102 at opposing ends of the media pack 102. In other embodiments, the cross-sectional shape of the filter element 100 and/or media pack 102 may be different. For example, the cross-sectional shape of the filter element 100 and/or media pack 102 may be oval shaped, elliptical, circular, or any other suitable shape. The media pack 102 defines a central cavity 110 extending along an axial direction through the media pack 102 between opposing axial ends of the media pack 102.

The media pack 102 is configured to reduce wear that can result from vibration and contact between the media pack 102 and the support body 108. The media pack 102 includes filter media 112 that is configured to filter particulate matter and/or other contaminants from a fluid flowing therethrough so as to produce a filtered fluid (e.g., a clean fluid). The filter media 112 may include a porous material having a predetermined pore size. The filter media 112 may be a paper-based filter media, a fiber-based filter media, a foam-based filter media, or the like. In the embodiment of FIG. 3, the media pack 102 includes a media form 113 including multiple layers of filter media. The media form 113 may include a formed filter media 114 (e.g., a first filter media, a primary filter media, an outer filter media, etc.) and an abrasion resistant barrier 116 (e.g., a wear barrier, a second filter media, an inner filter media, etc.). In other embodiments, the media form 113 may include additional and/or different layers.

As shown in FIG. 3, the formed filter media 114 is disposed proximate to an outer radius of the filter element 100. The formed filter media 114 may be pleated or otherwise formed to increase a flow area of the media pack 102, or to otherwise alter the particle removal efficiency of the filter element 100. For example, the formed filter media 114 may be a pleated filter media formed from a flat sheet and/or layer of filter media that is bent back onto itself or otherwise formed into an accordion shape. The formed filter media 114 may have a first plurality of pleat tips 117 defining a first face 118 along an inner perimeter of the formed filter media 114, and a second plurality of pleat tips 120 defining a second face 122 along an outer perimeter of the formed filter media 114. The first face 118 and the second face 122 may be reference planes that extend across the first plurality of pleat tips 117 and the second plurality of pleat tips 120, respectively.

Figure 4:
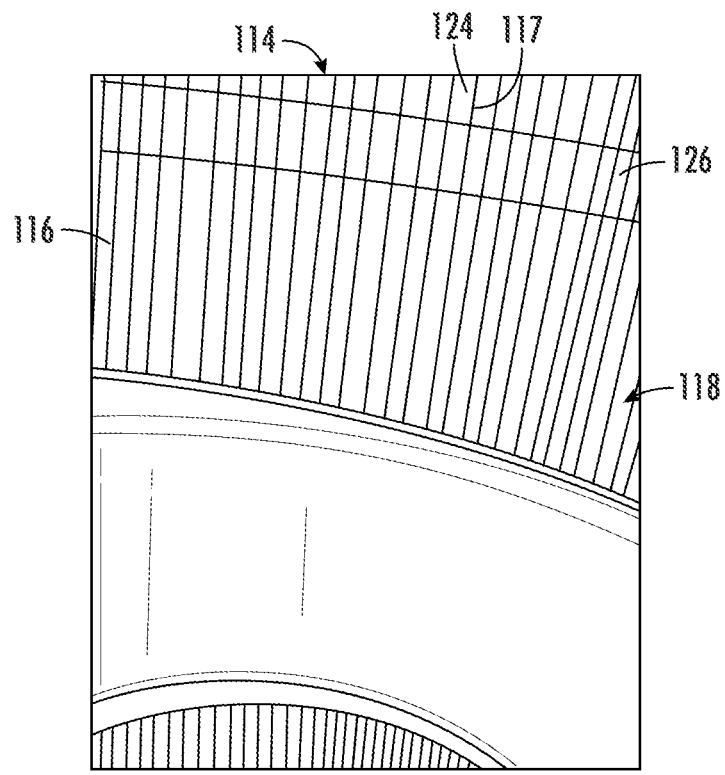
FIG. 4 is a side view of an interior portion of the filter element of FIG. 2.

As shown in FIG. 4, the first plurality of pleat tips 117 are formed by a first set of bend lines in the formed filter media 114 that extend parallel to the central axis of the media pack 102 (see also FIG. 3). Similarly, the second plurality of pleat tips 120 may be formed by a second set of bend lines in the formed filter media 114 that extend parallel to the central axis of the media pack 102. The first set of bend lines and the second set of bend lines may form "V" shaped media forms in the media pack 102. In other embodiments, the bend lines may be curves in the filter media and may form a sinusoidal waveform having "U" shaped forms. In yet other embodiments, a cross-sectional shape of the formed filter media 114 may be different. The formed filter media 114 may include wall segments 124 extending between the first plurality of pleat tips 117 and the second plurality of pleat tips 120. In some embodiments, the formed filter media 114 may further include corrugations, grooves, and/or depressions extending perpendicular to the first and second sets of bend lines that help to maintain separation between adjacent pleat tips.

Returning to FIG. 3, the abrasion resistant barrier 116 is coupled to the formed filter media 114 and is configured to separate the formed filter media 114 from the support body 108. The abrasion resistant barrier 116 is disposed on an inner radius of the formed filter media 114 between the formed filter media 114 and the support body 108. The abrasion resistant barrier 116 extends across the first plurality of pleat tips 117 and substantially covers the first face 118. In some embodiments, an inner radial surface of the abrasion resistant barrier 116 defines the central cavity 110 of the filter element 100. Among other benefits, positioning the abrasion resistant barrier 116 to cover the entire inner perimeter of the formed filter media 114 may allow the media pack 102 to be used with different support body designs, which may engage with the media pack 102 at different regions along the central cavity 110. However, it should be appreciated that the position of the abrasion resistant barrier 116 may be different in other embodiments. For example, the abrasion resistant barrier 116 may be positioned to only partially cover the formed filter media 114 (e.g., the first face 118) in regions in which the support structure is configured to engage with the media pack 102.

In some embodiments, the abrasion resistant barrier 116 includes a scrim layer that is made from a different material than the formed filter media 114. The scrim layer may be a woven or nonwoven material (e.g., fabric, etc.) that forms a harder surface than the material used in the formed filter media 114. In some embodiments, the scrim layer may include a polyester spun-bond material. In some embodiments, the scrim layer may include a substantially flat, unformed sheet of the same material used for the formed filter media 114. In yet other embodiments, the scrim layer may be made from another type of reinforcing material to reduce wear on the formed filter media 114.

As shown in FIG. 4, the media pack 102 also includes at least one adhesive bead 126 between the abrasion resistant barrier 116 and the formed filter media 114. The at least one adhesive bead 126 may include a line of hotmelt (e.g., thermoplastic resin, etc.) or another suitable adhesive product. In some embodiments, the at least one adhesive bead 126 couples the abrasion resistant barrier 116 to the formed filter media 114. In some embodiments, as will be further described, the media pack 102 may include a plurality of adhesive beads arranged in substantially parallel lines that extend longitudinally across the first face 118 of the formed filter media 114. The adhesive beads may extend across the first plurality of pleat tips 117 and may couple the first plurality of pleat tips 117 together so as to reduce the free, unconstrained length of the formed filter media 114 into smaller constrained segments. Among other benefits, reducing the free, unconstrained length of the formed filter media 114 (e.g., the pleats, etc.) increases the stiffness of the formed filter media 114 which can reduce the amplitude of media oscillations in response to vibration, which can reduce wear.

In some embodiments, the bond strength between different ones of the adhesive beads and the abrasion resistant barrier 116 may vary across the media pack 102. For example, a first bond strength between a first bead of the plurality of adhesive beads and the abrasion resistant barrier 116 may be different from (e.g., greater than) a second bond strength between a second bead of the plurality of adhesive beads and the abrasion resistant barrier 116. In at least one embodiment, the bond strength between adhesive beads along opposing edges of the formed filter media 114 (proximate to a first axial end 130 of the media pack 102 and a second axial end 132 of the media pack 102 as shown in FIG. 3) is greater than the bond strength between adhesive beads spaced apart from the first axial end 130 and the second axial end 132. This arrangement can prevent bypass along the axial ends of the media pack 102 between the formed filter media 114 and the abrasion resistant barrier 116 and can also prevent free ends of the abrasion resistant barrier 116 from detaching from the formed filter media 114.

In at least one embodiment, the abrasion resistant barrier 116, as supported by the plurality of adhesive beads, has a harder surface than the formed filter media 114 and/or the support body 108. The increase in surface hardness can reduce friction-induced wear on the media pack 102 (e.g., the formed filter media 114) that can be cause by rubbing and/or vibrating against the support body 108.

As shown in FIGS. 2-3, the media pack 102 is coupled to and supported by the support body 108. The support body 108 may be a center tube, a frame, and/or another suitable support structure that is configured to resist collapse of the filter element under loading (e.g., under radial loading due to an applied pressure drop across the filter element). In the embodiment of FIGS. 2-3, the support body 108 is a center tube that is disposed within the central cavity 110. The center tube may extend axially between the first axial end 130 of the media pack 102 and the second axial end 132 of the media pack 102. The center tube may be configured to engage the media pack 102 along an inner face of the media pack 102 (e.g., the abrasion resistant barrier 116) to support the media pack 102. The media pack 102 may be formed by wrapping the media form 113 around the support body 108 or inserting a pre-wrapped media form over the support body 108.

Figure 5:
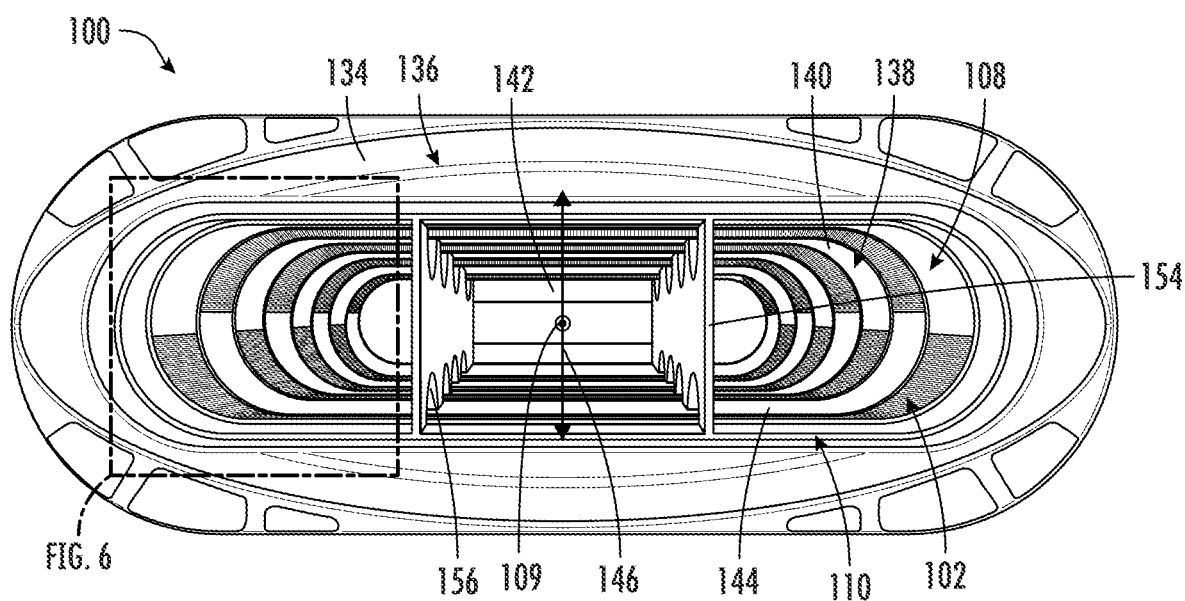
FIG. 5 is another top view of the filter element of FIG. 2.
Figure 6:
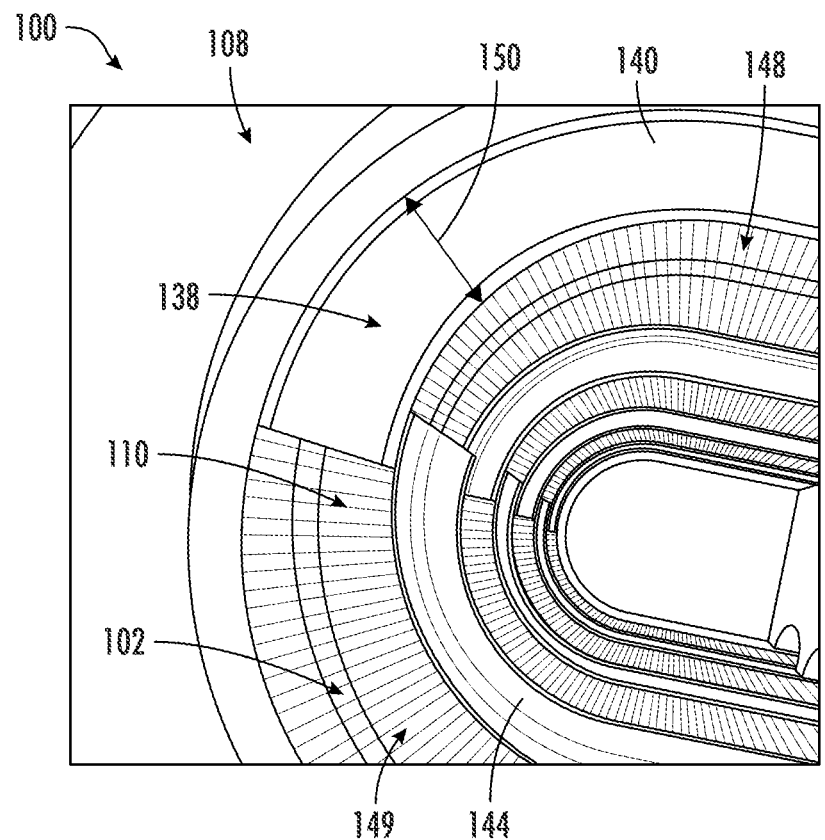
FIG. 6 is a top perspective view of another interior portion of the filter element of FIG. 2.

The support body 108 may be configured to reduce contact pressure on the media pack 102 without significantly increasing the restriction across the filter element 100. As shown in FIGS. 5-6, the support body 108 (e.g., center tube) includes a plurality of ribs 138 extending in a circumferential direction relative to the central axis 109 of the filter element 100 and along an inner diameter of the media pack 102. Each rib of the plurality of ribs 138 extends circumferentially along a perimeter region of the central cavity 110 and is configured to engage a corresponding portion of the media pack 102.

The plurality of ribs 138 may include alternating sets of ribs that extend in opposite directions from one another along a radial direction. For example, as shown in FIG. 5, the plurality of ribs 138 may include a first set of ribs 140 extending in a first radial direction 142 and a second set of ribs 144 extending in a second radial direction 146 that is opposite the first radial direction 142. As shown in FIG. 6, at least one rib of the first set of ribs 140 is disposed axially between a corresponding pair of ribs of the second set of ribs 144. At least one rib of the first set of ribs 140 may be engaged with the corresponding pair of ribs of the second set of ribs 144 at opposing ends (e.g., along a circumferential direction) of the at least one rib. In some embodiments, each one of first set of ribs 140 is engaged with a respective pair of the second set of ribs 144 at opposing circumferential ends of the ribs.

In some embodiments, the first set of ribs 140 and the second set of ribs 144 are stacked in an alternating arrangement along the axial direction to define (i) a plurality of first openings 148 between adjacent ones of the first set of ribs 140, and (ii) a plurality of second windows 149 between adjacent ones of the second set of ribs 144. Among other benefits, incorporating approximately equal size openings on either side of the support body 108 can promote uniform flow through opposite sides of the central cavity 110. In at least one embodiment, the plurality of ribs 138 is elongated along an axial direction relative a central axis of the filter element 100 to increase a contact area between the ribs and the media pack 102, which can reduce contact pressure and reduce wear between the ribs and the media pack 102 under radial loading. In at least one embodiment, an axial height 150 of at least one of the plurality of ribs 138 (as shown in FIG. 6) is greater than or equal to approximately ⅛ of an axial height 152 (as shown in FIG. 2) of the media pack 102. In other embodiments, the axial height of the plurality of ribs 138 may be different.

As shown in FIG. 5, the support body 108 may also include at least one lateral support member 154 (e.g., frame member, axial extension, etc.) coupled to and extending radially between the first set of ribs 140 and the second set of ribs 144 and supporting the first set of ribs 140 and the second set of ribs 144 against radial loading. The lateral support member 154 may include an elongated panel that extends along an axial direction relative to the central axis 109 of the filter element 100. In some embodiments, the support body 108 may include a plurality of lateral support members disposed at approximately equal intervals along the central cavity 110. As shown in FIG. 5, the lateral support member 154 may define slots 156 (e.g., cutouts, openings, etc.) on alternating sides of the lateral support member 154 that align with the openings between adjacent ribs, which can reduce the pressure drop across the support body 108.

As shown in FIGS. 2-3, the first endcap 104 (e.g., the first endplate, etc.) is coupled to the media pack 102 at a first axial end 130 of the media pack 102 and a second endcap 106 (e.g., the second endplate, etc.) coupled to the media pack 102 at a second axial end 132 of the media pack 102. The first endcap 104 and the second endcap 106 may be sealingly engaged with the media pack 102 to prevent fluid bypass between the media pack 102 and the first endcap 104 and the second endcap 106. In at least one embodiment, the first endcap 104 includes an elliptical protruding member 134 extending axially away from an upper surface of the first endcap 104 and away from the central cavity 110. As shown in FIG. 5, the elliptical protruding member 134 may define an opening 136 providing access to the central cavity 110. The first endcap 104 may include a seal member disposed on or integrally formed with the elliptical protruding member 134 that is configured to sealingly engage the filter element 100 with the air cleaner housing. For example, in one embodiment, the first endcap 104 may include an elliptical gasket that is overmolded onto the first endcap 104 and/or the elliptical protruding member 134. In other embodiments, the seal member may be integrally formed with the elliptical protruding member 134 as a unitary body from a single piece of material. It should be appreciated that the cross-sectional shape of the elliptical protruding member 134 and/or seal member may be different in various embodiments (and may be the same as or different from a cross-sectional shape of the media pack 102).

The support body 108 may be coupled to and extend axially between the first endcap 104 and the second endcap 106. In some embodiments, the support body 108 is integrally formed with at least one of the first endcap 104 or the second endcap 106 (e.g., the first endcap 104 and/or the second endcap 106) as a unitary body from a single piece of material so that the support body 108 cannot be removed from the first endcap 104 and/or the second endcap 106 without cutting or otherwise damaging the support body 108. In other embodiments, the support body 108 is formed separately from the first endcap 104 and/or the second endcap 106.

The first endcap 104, the second endcap 106, and/or the support body 108 may be made from plastic that is molded to into a desired shape. In other embodiments, the first endcap 104, the second endcap 106, and/or the support body 108 is made of a metal or metal alloy (e.g., aluminum, etc.).

Figure 7:
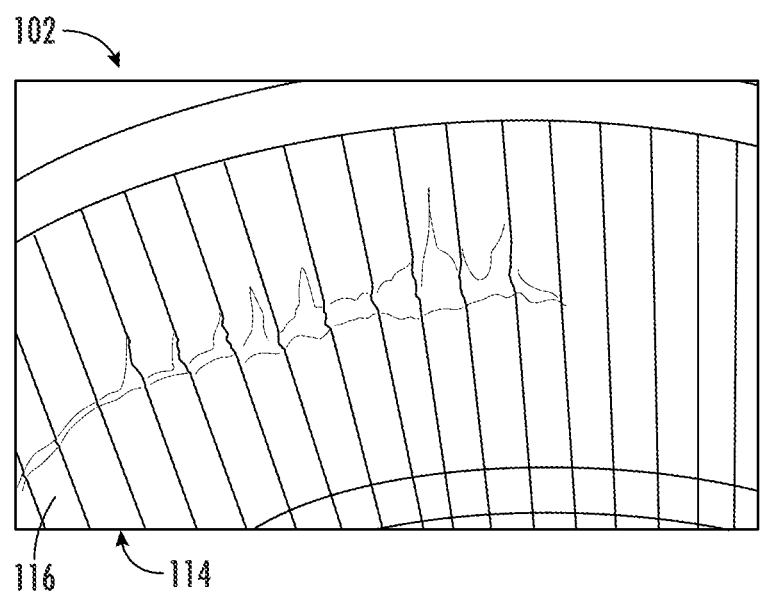
FIG. 7 is a perspective view of a worn filter media pack of a filter element, according to another embodiment.

As shown in FIG. 7, the design of the media pack 102 and support body 108 can significantly reduce vibration-induces wear of the filter element 100 during operation. The media pack 102 of FIG. 7 was subjected to vibration testing over a prolonged period to determine the performance of the abrasion resistant barrier 116 and support body. FIG. 7 shows minimal wear in the area of the support body 108 without any tearing of the formed filter media 114 or collapse of the formed filter media 114. The combination of the abrasion resistant barrier 116, adhesive beads, and support body 108 may increase the overall life of the filter element 100 by 2.5 times or greater as compared to filter elements without these features.

II. Example Method of Making a Media Pack with an Abrasion Resistant Barrier

FIG. 7 is a flow diagram of an example method 200 of making a media pack that includes an abrasion resistant barrier. The media pack may be the same as or similar to the media pack 102 described with reference to FIGS. 2-3. As such, similar numbering will be used to identify similar components. At 202, a formed filter media 114 is provided. Block 202 may include providing a flat, unformed sheet of filter media, and passing the filter media through a forming machine (e.g., pleater, etc.) to corrugate and/or pleat the filter media to form a first plurality of pleat tips 117 defining a first face 118 of the formed filter media 114 and a second plurality of pleat tips 120 defining a second face 122 of the formed filter media 114 that is spaced apart from the first face 118. Block 202 may also include feeding the formed filter media 114 into a media joining system.

Figure 8:
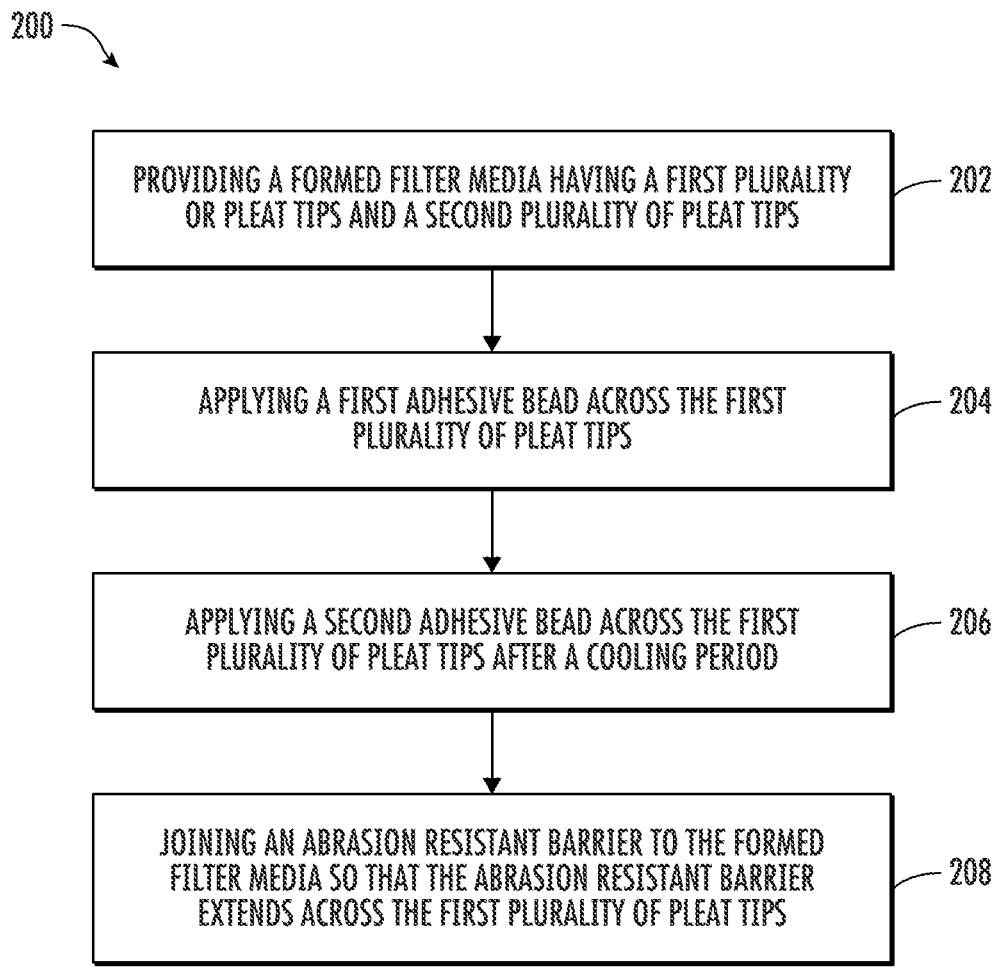
FIG. 8 is a flow diagram of a method of making a filter media pack for the filter element of FIG. 2, according to an embodiment.
Figure 9:
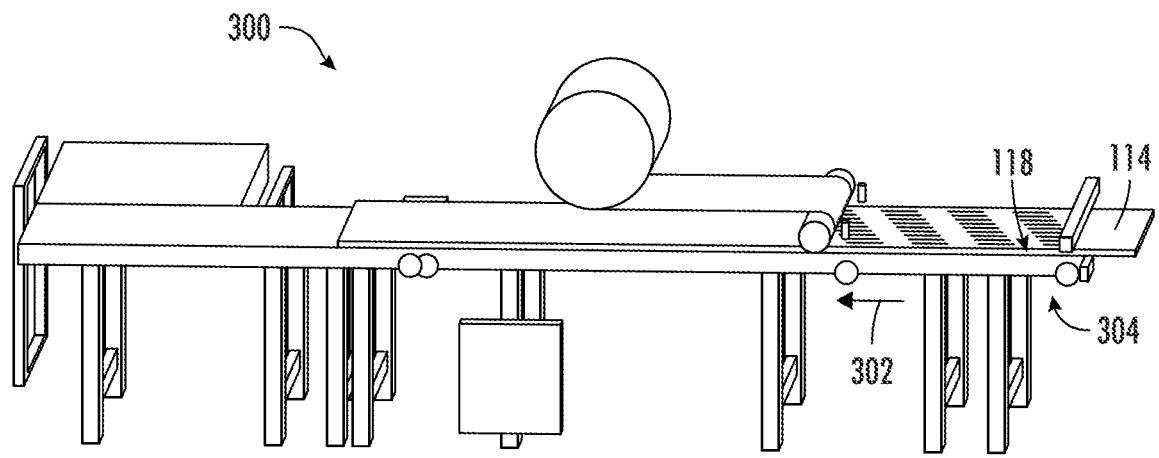
FIG. 9 is a side perspective view of a media joining system, according to an embodiment.
Figure 10:
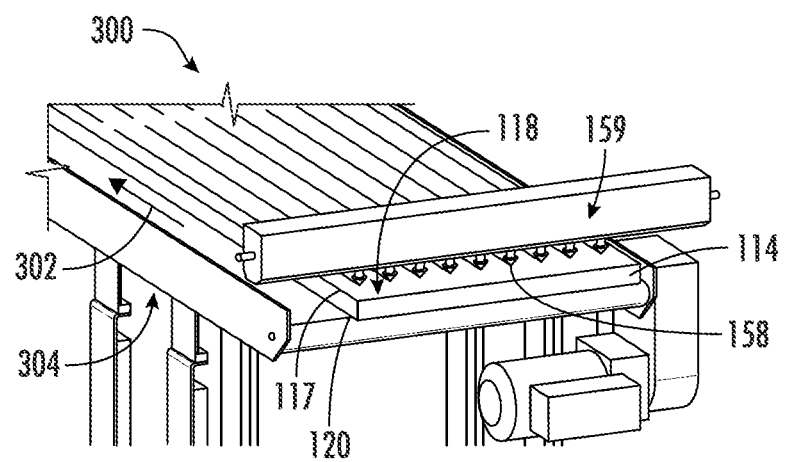
FIG. 10 is a perspective view of an adhesive application device of the media joining system of FIG. 9.

FIG. 9 shows a manufacturing system 300 (e.g., a media joining system, etc.) that may be used to perform the method 200 of FIG. 8. As shown, the formed filter media 114 is fed through the manufacturing system 300 along a longitudinal direction 302 by a conveyor 304. The formed filter media 114 may be arranged such that the pleat tips extend along a lateral direction perpendicular to the feed direction.

Returning to FIG. 7, at 204 a first adhesive bead 158 is applied across the first plurality of pleat tips 117 of the formed filter media 114 so as to couple the first plurality of pleat tips 117 together. Block 204 may include applying the first adhesive bead 158 at a first position along a width of the formed filter media 114. The first position may be spaced apart from a lateral edge of the formed filter media 114. In some embodiments, block 204 may include dispensing a plurality of adhesive beads spaced at approximately equal intervals across the first face 118 of the formed filter media 114. As shown in FIGS. 8-9, the plurality of first adhesive beads may be applied by dispensing an adhesive product at a first location along the conveyor 304 proximate to a first end of the conveyor 304 (e.g., a feed end, etc.). Block 204 may include sending a control signal to a plurality of adhesive dispensers 159 positioned above the formed filter media 114 to apply the adhesive beads.

Block 204 may further include deactivating the adhesive dispensers at periodic intervals to facilitate pack cutting and seaming operations (in areas in which the adhesive product may interfere with media cutting). For example, block 204 may include periodically deactivating the adhesive dispensers at times corresponding to 33 inch intervals along the formed filter media 114 or another suitable interval depending on the intended size of the filter element.

Figure 11:
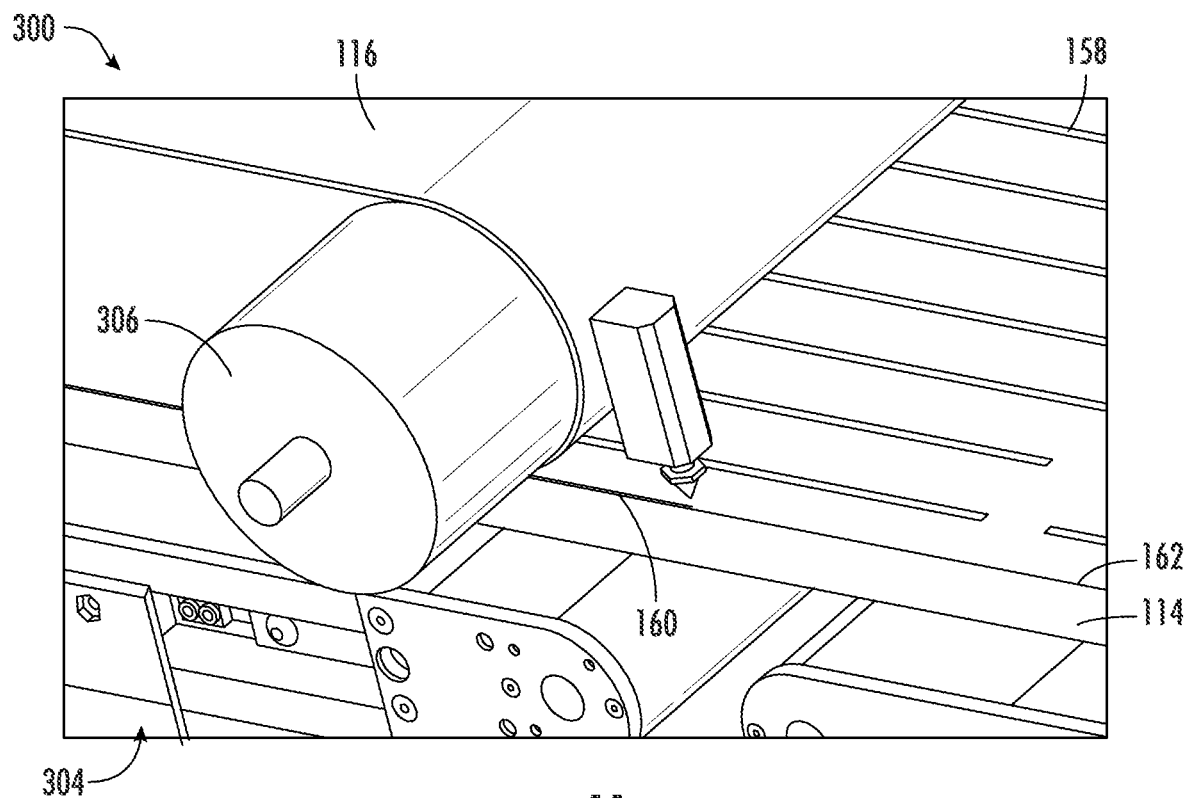
FIG. 11 is a perspective view of an edge adhesive application device and media roller of the media joining system of FIG. 9.
Figure 12:
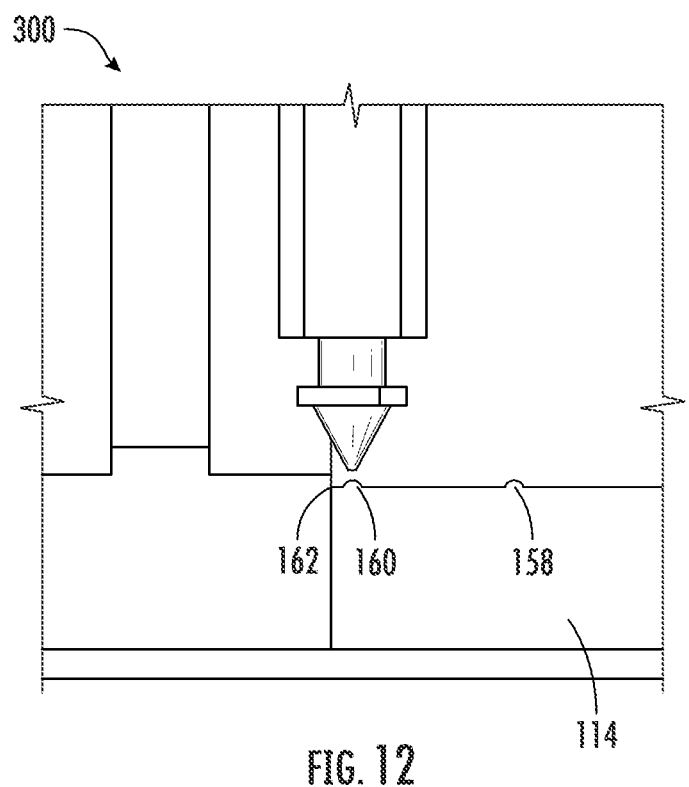
FIG. 12 is a front view of the edge adhesive application device of FIG. 11.

At 206, a second adhesive bead 160 is applied across the first plurality of pleat tips 117. Block 206 may include applying the second adhesive bead 160 at a second position along the width of the formed filter media 114. The second position may be disposed along an edge 162 of the formed filter media 114 as shown in FIGS. 11-12. In some embodiments, block 204 may include dispensing a third adhesive bead to the formed filter media 114 along an opposite lateral edge of the formed filter media 114 as the second adhesive bead 160.

In some embodiments, block 204 may include dispensing the second and/or third adhesive beads after a cooling period following the application of the plurality of first adhesive beads so as to provide time for the plurality of first adhesive beads to at least partially cool and harden. Among other benefits, providing time for the plurality of first adhesive beads to cool before applying the abrasion resistant barrier 116 may improve adhesion between the abrasion resistant barrier 116 and the second and third adhesive beads, which can help to ensure that the abrasion resistant barrier 116 is fully coupled to the edges of the formed filter media 114. As shown in FIGS. 11-12, the second and third adhesive beads may be applied at a second location along the conveyor 304 that is proximate to where the abrasion resistant barrier 116 is applied onto the formed filter media 114 (so that the adhesive beads along the edge of the formed filter media 114 are applied immediately ahead of the abrasion resistant barrier 116).

At 208, the abrasion resistant barrier 116 is joined with and/or coupled to the formed filter media 114 so that the abrasion resistant barrier 116 extends across the first plurality of pleat tips 117. As shown in FIG. 11, block 208 may include providing the abrasion resistant barrier 116 as a bulk roll and feeding the abrasion resistant barrier 116 via a roller 306 onto the first face 118 of the formed filter media 114. Block 208 may further include aligning the abrasion resistant barrier 116 with the formed filter media 114 so that the abrasion resistant barrier 116 substantially covers the entire first face 118.

It should be noted that the term "example" as used herein to describe various embodiments is intended to indicate that such embodiments are possible examples, representations, and/or illustrations of possible embodiments (and such term is not intended to connote that such embodiments are necessarily extraordinary or superlative examples).

As utilized herein, the term "substantially" and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed (e.g., within plus or minus five percent of a given angle or other value) are considered to be within the scope of the invention as recited in the appended claims.

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Other substitutions, modifications, changes and omissions may also be made in the design, operating conditions and arrangement of the various exemplary embodiments without departing from the scope of the embodiments described herein.

While this specification contains many specific implementation details, these should not be construed as limitations on the scope of any embodiment or of what may be claimed, but rather as descriptions of features specific to particular implementations of particular embodiments. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A filter element, comprising:
   a media pack defining a central cavity, the media pack comprising:
      a pleated filter media;
      an abrasion resistant barrier coupled to the pleated filter media; and
      a plurality of adhesive beads between the abrasion resistant barrier and the pleated filter media, the plurality of adhesive beads coupling the abrasion resistant barrier to the pleated filter media, wherein (i) a first bond strength between the abrasion resistant barrier and a first set of the plurality of adhesive beads that are proximate to opposing axial ends of the pleated filter media is greater than (ii) a second bond strength between the abrasion resistant barrier and a second set of the plurality of adhesive beads that are spaced apart from the opposing axial ends; and
   a support body disposed within the central cavity, the abrasion resistant barrier separating the pleated filter media from the support body.

2. The filter element of claim 1, wherein the plurality of adhesive beads extend across pleat tips of the pleated filter media and couple the pleat tips together.

3. The filter element of claim 1, wherein the first set of the plurality of adhesive beads comprises an adhesive bead that is disposed at an axial end of the pleated filter media.

4. The filter element of claim 1, wherein the abrasion resistant barrier supported by the plurality of adhesive beads has a harder surface than the support body.

5. The filter element of claim 1, wherein the support body comprises a plurality of ribs extending in a circumferential direction along an inner diameter of the media pack, the plurality of ribs including a first set of ribs extending in a first radial direction, and a second set of ribs extending in a second radial direction that is opposite the first radial direction, at least one rib from the first set of ribs disposed axially between a corresponding pair of ribs of the second set of ribs.

6. The filter element of claim 5, wherein the first set of ribs and the second set of ribs are stacked in an alternating arrangement along an axial direction.

7. The filter element of claim 5, wherein the support body further comprises a lateral support member, the lateral support member extending along an axial direction, the lateral support member coupled to and extending radially between the first set of ribs and the second set of ribs.

8. The filter element of claim 5, wherein an axial height of at least one of the plurality of ribs is greater than or equal to approximately ⅛ of an axial height of the media pack.

9. The filter element of claim 1, wherein:
   the pleated filter media includes a first plurality of pleat tips defining a first face, and a second plurality of pleat tips defining a second face spaced apart from the first face, the abrasion resistant barrier extending across the first plurality of pleat tips and substantially covering the first face.

10. The filter element of claim 9, wherein the first set of the plurality of adhesive beads includes an adhesive bead that extends longitudinally across the first face and couples the first plurality of pleat tips together.

11. The filter element of claim 9, wherein the first set of the plurality of adhesive beads comprises an adhesive bead that is disposed at an end of the pleated filter media.

12. The filter element of claim 1, wherein the first set of the plurality of adhesive beads comprises a first adhesive bead disposed at a first axial end of the pleated filter media and a second adhesive bead disposed at a second axial end of the pleated filter media opposite from the first axial end.

13. The filter element of claim 1, wherein the abrasion resistant barrier comprises a scrim layer that is made from a different material than the pleated filter media.

14. A filter element, comprising:
   a media pack defining a central cavity, the media pack comprising:
      a formed filter media; and
      an abrasion resistant barrier coupled to the formed filter media; and
   a support body disposed within the central cavity, the abrasion resistant barrier separating the formed filter media from the support body, the support body comprising a plurality of ribs extending in a circumferential direction along an inner diameter of the media pack, the plurality of ribs comprising:
      a first set of ribs extending in a first radial direction; and
      a second set of ribs extending in a second radial direction that is opposite the first radial direction, at least one rib from the first set of ribs disposed axially between a corresponding pair of ribs of the second set of ribs, the at least one rib of the first set of ribs is engaged with the corresponding pair of ribs of the second set of ribs at opposing ends of the at least one rib.

15. A method of making a filter element, comprising:
   providing a pleated filter media;
   applying a plurality of adhesive beads to the pleated filter media;
   joining an abrasion resistant barrier to the pleated filter media by the plurality of adhesive beads so that the plurality of adhesive beads is disposed between the abrasion resistant barrier and the pleated filter media, and so that (i) a first bond strength between the abrasion resistant barrier and a first set of the plurality of adhesive beads that are proximate to opposing axial ends of the pleated filter media is greater than (ii) a second bond strength between the abrasion resistant barrier and a second set of the plurality of adhesive beads that are spaced apart from the opposing axial ends, the pleated filter media, the plurality of adhesive beads, and the abrasion resistant barrier together defining a media pack; and positioning a support body within a central cavity defined by the media pack so that the abrasion resistant barrier separates the pleated filter media from the support body.

16. The method of claim 15, wherein the pleated filter media has a first plurality of pleat tips defining a first face and a second set of pleats tips defining a second face spaced apart from the first face, wherein the method further comprising applying the plurality of adhesive beads across the first plurality of pleat tips of the pleated filter media.

17. The method of claim 15, wherein applying the plurality of adhesive beads comprises:

applying a first adhesive bead of the plurality of adhesive beads at a first position along a width of the pleated filter media; and applying a second adhesive bead of the plurality of adhesive beads at a second position along the width of the pleated filter media after a cooling period.

18. The method of claim 17, wherein the second position is disposed along an edge of the pleated filter media and the first position is spaced apart from the edge.

* * * * *